July 29, 1952     R. R. PROCTOR ET AL     2,605,304
ELECTRIC MOTOR LOAD INDICATOR
Filed Oct. 18, 1947
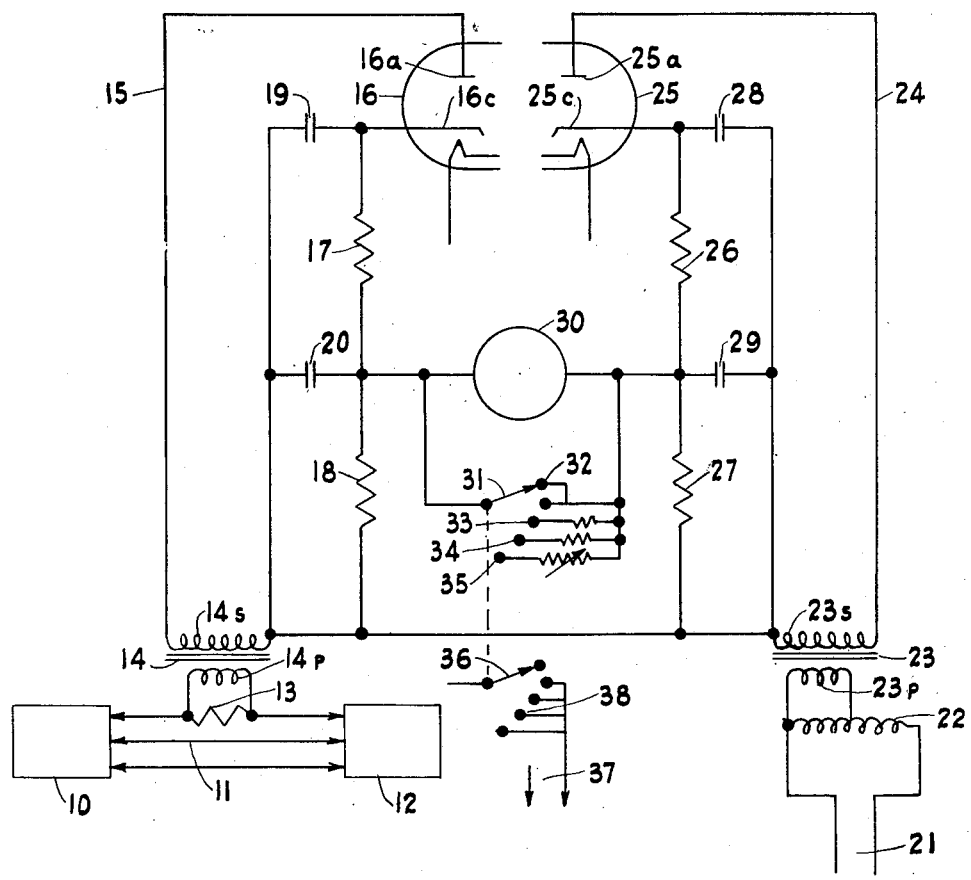
INVENTORS.
RONALD R. PROCTOR
BY LYNN E. ELLISON
Edward H. Fay
ATTORNEY Patented July 29, 1952

2,605,304

UNITED STATES PATENT OFFICE 2,605,304

ELECTRIC MOTOR LOAD INDICATOR

Ronald R. Proctor, Evanston, and Lynn E. Ellison, Crystal Lake, Ill., assignors to The Pure Oil Company, Chicago, Ill., a corporation of Ohio Application October 18, 1947, Serial No. 780,648

3 Claims. (Cl. 171—95)

This invention relates to an apparatus and method for obtaining information on the operating conditions of power consuming machinery and for aiding in the control and regulation thereof. It has particular application in situations which involve analyzing the operation of machine tools.

In machining operations, which usually require use of cutting fluids, a problem which is universally encountered is that of detecting tool failure in time to save the tool and avoid substantial faulty cutting of the work piece. That is to say, normally a tool can begin to fail, and such failure can progress to a fairly acute stage, before it will manifest itself by an observable depreciation in the quality of the surface of the work piece. Whether it be failure of the tool or of the cutting fluid used which causes the difficulty, it is highly desirable in any operation to detect incipient failure of either the tool or the cutting fluid, thereby to give the operator time to take corrective steps.

The problem, though it has specific application in machining operations, also has general application in that it involves detection of the departure from steady state operation at as early a stage as possible to permit an operator to take corrective steps. In the testing of any tool, such as a drill, milling machine, lathe, or any of that type of cutting instrument operating at constant feed and speed, failure of the tool or cutting fluid would be reflected by a change from steady state operation, such as an increase in the power demand. Where a routine visual observation of the work is resorted to, detection of the failure will often be too late to permit saving of the work or the tool.

Accordingly, it is a fundamental object of this invention to provide an apparatus and a method by which an incipient departure from steady state conditions in power consumption can be detected conveniently.

It is a second object of the invention to provide an apparatus for indicating early failure of tools in cutting operations.

It is another object of the invention to provide an apparatus and a method for testing cutting fluids.

Other objects and advantages of the invention will in part be obvious and in part appear hereinafter.

The invention includes a method and apparatus for detecting incipient departure of a power consuming system from steady state conditions, which apparatus has the features of construction, combination of elements and arrangement of parts hereinafter described in greater detail and which method involves the several steps and relationship of the steps to each other for detecting the said departure.

More specifically, the invention comprises an electrical apparatus involving a balanced circuit by which a variation in the consumption of power by a machine is compared with a standard power supply to give an indication of whether or not the consumption of power by the machine is being maintained at a constant level within certain tolerance limits. The apparatus involves in combination a probe for taking a sample voltage from the power supply, a balanced circuit for rectifying it and comparing it with a standard or reference voltage applied to the second side of said balanced circuit, whereby a differential signal developed between the two sides as a result of a condition of unbalance will give an indication of the magnitude and direction of the departure from steady state condition.

The scope of the invention and the construction of the apparatus will be more clearly understood by reference to the detailed description below and the accompanying drawing in which:

Figure 1 is a schematic diagram of an electric circuit showing an operative arrangement of elements to accomplish the measurement described.

In the figure, 10 represents a power supply, shown to be a three-phase alternating current supply, brought by means of conduits 11 to a load indicated generally as a machine 12. In one leg of the power supply, there is placed a resistor 13, preferably having a low resistance on the order of one ohm or a fraction thereof for large motors and one ohm or more for small motors. Across the resistor 13, there is connected the primary coil 14p of transformer 14 which has its secondary coil 14s supplying voltage to one half of the balanced detecting circuit. Connection is made from coil 14s by way of line 15 to plate 16a of tube 16. Return from the cathode 16c is made by way of resistor 17 connected in series with resistor 18, which returns to the other side of coil 14s. Filtering condenser 19 is connected between the end of coil 14s and the cathode of the tube 16; similarly, filtering condenser 20 is connected between the end of coil 14s and a point between the two resistors 17 and 18.

The second half, or standard portion of the circuit physically is made substantially identical with the portion described, but is supplied with an adjustable reference voltage which is kept constant at any predetermined setting. Referring to the diagram, a standard alternating current voltage is supplied by lines 21 to the primary 22 of an adjustable-output auto-transformer. A portion of this voltage is tapped off to feed primary coil 23p of transformer 23, thereby applying a steady voltage to secondary 23s. It will be observed that one end of secondary 23s is connected by way of line 24 to the plate 25a of tube 25. Return from the cathode 25c is made by way of resistors 26 and 27 to the other side of coil 23s. Filtering condenser 28 is connected between the end of coil 23s and the cathode 25c; and in similar fashion, filtering condenser 29 is connected between the end of coil 23s and a point between the two resistors 26 and 27.

The tubes 16 and 25 can be any ordinary rectifying tubes, and, as a matter of convenience, a double rectifier having both tubes in the same envelope is useful.

Connected between the junction points of the two pairs of resistors 17, 18, and 26, 27, there is galvanometer 30. This can be a small microammeter, preferably a zero center reading type in order that deflections in either direction can be detected.

Across the meter or galvanometer 30, there is connected a selecting or calibrating circuit for setting the range or sensitivity of the meter, which consists of switch 31 having a plurality of positions 32, 33, 34, and 35 for shunting resistors of different values around meter 30. It will be observed that by inserting various resistors in the line and by maintaining one of them a variable, the sensitivity of the meter can be adjusted to a variety of levels. Switch 31, which is a double pole multi-position switch, controls the flow of current to transformer 22 and the filaments of the tubes 16 and 25 through its second half 36 by way of line 37 and connections 38.

The device should be built with the two halves of the circuit substantially identical electrically, so that the apparatus can be brought to a stable balance to correspond to steady state conditions. This involves making resistors 17 and 26, and 18 and 27 closely matched. It has been found that values of about 5000 ohms are suitable when used with a 117Z6 rectifier tube and a 30-0-30 microampere galvanometer.

The operation of the device is apparent from the general description of the circuit, but it should be noted that most successful operation is attained when the value of sensing resistor 13 is set so that the voltage developed across it under normal operating conditions is equal to the proper primary voltage for application to the primary coil 14p of the high ratio step-up transformer 14.

To consider the operation of the device in detail, let it be assumed that power supply 10 is furnishing three-phase alternating current to a machine 12 which is a lathe cutting a metal work piece while using a given cutting fluid. When the surface speed of the work in the machine is kept at a constant value, it will be understood that the load on the tool will be constant and, consequently, the load demanded from the power supply will be constant. A deviation from the steady state load which causes the driving motor of the machine to draw more current indicates failure of the tool, or a change in some factor affecting the cutting operation.

As soon as the load demanded from the power supply deviates slightly from that required for steady state operation, the voltage across sensing resistor 13 will change, the changed voltage will be applied to coil 14p and produce a corresponding magnified change in coil 14s of transformer 14. This magnified voltage is applied to the plate 16a of rectifier tube 16 and current conducted from the cathode through resistors 17 and 18 back to the other side of the coil. At the same time, a reference voltage is applied through coil 23s to the plate 25a of tube 25 and current returned by way of resistors 26 and 27 to the other side of the said coil. The magnitude of the voltage applied to coil 23p is set so that the voltage drop across resistors 26 and 27 will be the same as the voltage drop across resistors 17 and 18 when steady state conditions prevail. It will be noted that if the voltage drop across resistors 17 and 26 is the same, no current will flow through meter 30 and no indication will be obtained therefrom. However, when a deviation from steady state operation occurs and a change in demand on the power supply 10 results, a change in the current flowing through resistors 17 and 18 will be reflected by a change in voltage across them, thus unbalancing the circuit and producing a corresponding indication of the meter 30.

As noted in the description of the meter, adjustment of the sensitivity of its circuit by the insertion of a high shunting resistance by means of switch 31 will make it possible to detect very slight deviations in the power supply demanded by the machine.

It should also be noted that the single-phase power source which supplies heater voltage to tubes 16 and 25 and transformer 22 through switch 36 can be tapped off the three-phase leads 11 with the result that any variation of voltage due to supply fluctuations will act on both halves of the bridge equally so that no indication will be apparent on the meter 30. Hence, the instrument responds only to load changes.

In the testing of cutting fluids with the apparatus described, it has been found that the device will reliably detect failures in the tool which are invisible to the naked eye and require microscopic examination of the tool and the work piece to be located. Thus, it will be seen that when it is desired to measure the conditions under which a cutting fluid can be expected to function properly, the detection of incipient failure of the tool serves as a valuable indication of the severity of conditions to which the fluid can be subjected. In this fashion, various cutting fluid compositions were tested and results found reproducible to a degree of precision unattainable by any other means. Conversely, using the same cutting fluid, the performance of various types of tools differing in material and in shape can be determined, as well as the life expectancy of various tools in cutting various types of material.

The general applicability of the apparatus to the control of alternating current installations which normally operate under steady state conditions should be apparent for any change in the load on a system which causes a deviation can be readily detected. For example, the device can be used on pumps to detect packing failure or clogged lines, and in conveyor systems to guard against overloading. Thus, although only one specific embodiment of the apparatus has been described in detail, since changes in the embodiment can be made without departing from the scope of the invention, it is intended that all matter included in the description or shown in the drawing shall be interpreted as illustrative and not in a limiting sense.

What is claimed is:

1. A test apparatus comprising in combination, a power supply to a power driven cutting tool undergoing test, detecting means connected to said power supply including a resistor, a coil across said resistor to form the primary of a first transformer, a secondary coil coupled with said primary, a rectifier and a first pair of fixed resistors in series in said secondary coil circuit, a second rectifier and a second pair of fixed resistors matching said first pair, a coil across said second rectifier and said second pair of resistors forming the secondary of a second transformer, and a primary coil to supply a fixed voltage to said second transformer, and an indicator bridging said resistors to detect and show the direction and magnitude of any unbalance in the system.

2. Apparatus in accordance with claim 1 in which the indicator is connected across the resistors at substantially their midpoints.

3. A test apparatus for determining small changes in power under substantially constant voltage conditions comprising in combination, a power supply to an electrically powered machine, detecting means connected to said power supply including a resistor, a coil across said resistor to form the primary of a first transformer, a secondary coil inductively coupled with said primary, a rectifier and a resistance-capacitance filter net-work in series therewith, a second rectifier and a second resistance-capacitance filter net-work in series therewith, a secondary coil supplying said second rectifier and a primary coil to supply a fixed voltage to said second secondary coil and an indicator bridging said resistance-capacitance net-works at their mid points to detect and show the direction and magnitude of any unbalance in the system.

RONALD R. PROCTOR.
LYNN E. ELLISON.

REFERENCES CITED

The following references are of record in the file of this patent:

UNITED STATES PATENTS

| Number | Name | Date |
|---|---|---|
| 1,369,403 | Demarest et al. | Feb. 22, 1921 |
| 1,449,458 | Sutermeister | Mar. 27, 1923 |
| 1,602,882 | Chubb | Oct. 12, 1926 |
| 1,629,858 | Browning | May 24, 1927 |
| 1,810,405 | Schaefer | June 16, 1931 |
| 2,054,787 | Beavers et al. | Sept. 22, 1936 |
| 2,067,996 | Werder | Jan. 19, 1937 |
| 2,266,733 | Bays et al. | Dec. 23, 1941 |
| 2,426,204 | Grieg | Aug. 26, 1947 |
| 2,434,547 | Browne | Jan. 13, 1948 |

FOREIGN PATENTS

| Number | Country | Date |
|---|---|---|
| 558,614 | Great Britain | Jan. 13, 1944 |